United States Patent  (10) Patent No.: US 8,228,400 B2
Liu et al.  (45) Date of Patent: Jul. 24, 2012

(54) GENERATION OF SIMULATED LONG EXPOSURE IMAGES IN RESPONSE TO MULTIPLE SHORT EXPOSURES

(75) Inventors: Ming-Chang Liu, San Jose, CA (US); Mark Robertson, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 412 days.

(21) Appl. No.: 12/426,101

(22) Filed: Apr. 17, 2009

(65) Prior Publication Data

US 2010/0265357 A1 Oct. 21, 2010

(51) Int. Cl.
  H04N 5/262 (2006.01)
  H04N 5/228 (2006.01)
  H04N 5/225 (2006.01)

(52) U.S. Cl. ............. 348/239; 348/208.4; 348/208.12; 348/222.1; 348/362

(58) Field of Classification Search ............ 348/239, 348/222.1, 362, 208.99, 208.4, 208.12, 208.13, 348/297; 382/107, 254
See application file for complete search history.

(56) References Cited

U.S. PATENT DOCUMENTS

| 7,180,043 | B2 | 2/2007 | Washisu | |
|---|---|---|---|---|
| 2003/0215153 | A1* | 11/2003 | Gindele et al. | 382/254 |
| 2004/0145673 | A1* | 7/2004 | Washisu | 348/364 |
| 2005/0280733 | A1 | 12/2005 | Imaizumi | |
| 2006/0062557 | A1 | 3/2006 | Imada | |
| 2007/0035630 | A1 | 2/2007 | Lindenstruth et al. | |
| 2007/0098299 | A1* | 5/2007 | Matsumoto | 382/284 |
| 2007/0127574 | A1* | 6/2007 | Yao et al. | 375/240.16 |
| 2007/0177048 | A1* | 8/2007 | Van Dyke et al. | 348/362 |
| 2008/0259169 | A1* | 10/2008 | Nagano et al. | 348/208.4 |
| 2009/0135295 | A1* | 5/2009 | Kunishige et al. | 348/362 |

OTHER PUBLICATIONS

Tawbaware, "Image Stacker" http://www.tawbaware.com/imgstack.htm (website)—Jul. 2, 2005.
Hapeman, "Long-Exposure Astrophotography" http://naturescapes.net/102007/jh1007/htm (journal/website), Oct. 2007.
Sachs. "Using Picture Window in Astrophotography" http://www.dl-c.com/astro.pdf (journal/website), p. 6, 1998.
Farisu et al., "Multiframe Demosaicing and Super-Resolution of Color Images" IEEE Transactions on Image Processing, Jan. 2006, pp. 141-159, vol. 15, No. 1.
Robertson et al., "Mosaics from MPEG-2 Video", Paper from Air Force Research Laboratory and Northrop-Grumman Information Technologies, 2003, New York.
Borman, "Super-Resolution from Image Sequences—A Review", Paper from Dept. of Electrical Engineering, University of Notre Dame, 1998, Notre Dame, Indiana.

(Continued)

*Primary Examiner* — Nhan T Tran
(74) *Attorney, Agent, or Firm* — John P. O'Banion

(57) ABSTRACT

Simulating a long exposure-time image from a sequence of short exposure-time images captured at slightly different times. The sequence of images is combined in a temporal integration process to create a long exposure image that simulates the output from a still camera, steadied by a tripod, whose light-sensitive material has been exposed to the same scene from the time of the beginning of the first input image of the sequence to the last image of the input sequence. The method overcomes limitations of hand-held video and image recording devices, allowing the user to easily create effects normally associated with high-end digital still cameras under expert control.

20 Claims, 7 Drawing Sheets

OTHER PUBLICATIONS

Debevec, "Recovering High Dynamic Range Radiance Maps from Photographs", Paper from University of California, Berkeley, 1997, Berkeley, California.

Schultz, "Extraction of High-Resolution Frames from Video Sequences" IEEE International Conference on Acoustics Speech and Signal Processing, May 1995, Detroit, Michigan.

Mann, "On Being 'Undigital' with Digital Cameras: Extending Dynamic Range by Combining Differently Exposed Pictures" MIT Media Laboratory Perceptual Computing Section Technical Report, May 1995, No. TR-313, IS&T 48th Annual Conference, Washington, DC.

Obodez, "Robust Multiresolution Estimation of Parametric Motion Models Applied to Complex Scenes", Publication Interne No. 788 IRISA, 1994, Campus De Beaulieu, France, ISSN 1166-8687.

European Patent Office, Extended European Search Report, EP application No. 10 15 3325.5—counterpart to U.S. Appl. No. 12/426,101, issued Jul. 29, 2010, including claims searched.

Brostow, G.J. et al.—"Image-Based Motion Blur for Stop Motion Animation"—Computer Graphics. SIGGRAPH 2001 Conf. Proc., Los Angeles, CA , Aug. 12-17, 2001, pp. 561-566.

"Joe's Filters: Joe's Multi-Frame Blender"—Internet Citation, Mar. 9, 2008, URL:http://web.archive.org/web/20080309202349/http://www.joesfilters.com/joes_multiframe_blender.

Spampinato, G. et al.—"Camera Shaking Effects Reduction by means of Still Sequence Stabilization and Spatio-Temporal Filtering"—Consumer Electronics, Jan. 10, 2009, ICCE, Digest of Technical Papers International, pp. 1-2.

Liu, X. et al.—"Synthesis of High Dynamic Range Motion Blur Free Image From Multiple Captures"—IEEE Transactions on Circuits and Systems Part I: Regular Papers, IEEE Service Center, New York, NY, vol. 50, No. 4, Apr. 1, 2003, pp. 530-539.

* cited by examiner

GENERATION OF SIMULATED LONG EXPOSURE IMAGES IN RESPONSE TO MULTIPLE SHORT EXPOSURES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to digital photography, and more particularly to a camera configured for simulating long exposure still pictures.

2. Description of Related Art

Long exposure-time still images (long exposure images) have long been used for creating artistic effects, such as in representing motion, smoothing motions, and for isolating a stationary subject. Since the aperture must be left open for a significant period of time, it is difficult or even impossible in some circumstances for a consumer to take a long exposure still picture without the assistance of a tripod. In addition, the camera controls necessary for creating a useful long exposure image are often only available on high-end single-lens reflex (SLR) cameras. The average consumer taking occasional photos usually prefers not to be burdened with carrying a tripod, or trying to figure out the nuances involved in creating long exposure images and thus is not able to take advantage of their creative possibilities.

FIG. 1 depicts the conventional process 10 for obtaining a long exposure-time image. A camera device 12 is retained on a steady rest 14 (e.g., tripod and typically with a remote shutter control (not shown)). The camera aperture is set for a given small aperture size and a long exposure interval 16. It will be noted that to create a long exposure photograph with a conventional still camera the light-sensing elements are exposed to light from the scene for the duration of the exposure, which can span from fractions of a second to minutes, or even hours.

To prevent unintentional blurring of stationary scene content when taking conventional long exposure images, the camera must be maintained very still during exposure. For relatively short exposures, for example as long as about $1/60^{th}$ of a second, a person without benefit of a stationary mount (e.g., tripod) can maintain themselves sufficiently still to prevent the blurring which results from camera shake. Slightly longer exposures are possible with various camera stabilization technologies such as Sony's Super SteadyShot®. However, for longer exposures, a tripod becomes necessary to prevent blurring of the static regions of the scene. Rapidly moving objects may still exhibit camera shake induced motion blur, regardless of how steady the camera is maintained.

It should be appreciated that the term "exposure", as used in photography, describes the total amount of light allowed to fall on the image sensor (or photographic medium) while the shutter is open. Exposure is typically measured in lux seconds, and can be computed from exposure value (EV) and scene luminance over a specified area.

The term "long exposure" is a term of photographic art often referring to the technique of selecting a shutter speed which is much slower than necessary for the given light conditions toward providing a desired photographic effect. For example, although an image could be captured with a $1/100^{th}$ of a second exposure at a first aperture setting, the photographer chooses an exposure time of ½ second to 10 seconds and a much smaller second aperture setting. The term "long exposure" is generally used herein to mean an exposure duration which is not readily achieved without the need of a tripod and/or other equipment, and is contrasted to "short" or "normal" exposure times which can be generally obtained without the need of a tripod or other steady mount.

Long exposure images are captured for any of a number of purposes. One such purpose for long exposure images is that of artistic blur, in which stationary parts of the scene retain perfect detail while moving parts of the scene are motion blurred. Photographers have used this technique to create dramatic results, including: (1) creating a misty, cloudy, or creamy effect for moving water, such as waterfalls or fountains; (2) to "bring out" a stationary subject in a dynamic environment by allowing motion blur to de-emphasize the moving objects; (3) to draw a contrast between stationary and moving parts of the scene; (4) to exaggerate the apparent speed of a moving object, or objects; (5) to create special lighting effects, such as streaking headlights or taillights of automobiles, and to provide other dramatic effects. Examples of some of these effects are shown in a later section.

Another purpose for long exposures is to increase the signal to noise ratio and thus improve image quality. The extension of the exposure time increases the signal strength relative to the noise, leading to "cleaner" higher quality images and is particularly well suited for photographs taken in very low-light situations. This effect is most dramatically seen when used in low-light conditions in which available signal strength is low.

As a practical matter, many consumers or other amateur photographers never bother with taking long exposure pictures in view of the difficulties involved. Barriers to consumer creation of long exposure pictures include the following. (1) The burden of carrying a tripod and/or associated accessories such as a shutter release cable or remote control. (2) Many situations and environments are not amenable to the use of tripods, such as on a busy sidewalk, from a moving vehicle and so forth. (3) The user may have never learned, or may not remember, how to effectively create long exposures. (4) It often requires a great deal of experimentation (many attempts) for an amateur to obtain useful results.

Accordingly, a need exists for a system and method of automatically creating long exposure images with less equipment and difficulty. These needs and others are met within the present invention, which overcomes the deficiencies of previously developed camera systems and methods.

BRIEF SUMMARY OF THE INVENTION

An apparatus and method are taught for generating long exposure images in response to an integrated form of combining a plurality of shorter exposure images which can be captured without the need of a tripod or other means for preventing camera shake. The invention can be embodied in various equipment, including digital cameras (still and/or video), as well as image processing apparatus and programs.

The invention performs a specialized form of combining multiple images, captured at different moments in time, into a single image that simulates the output from a still camera, as steadied by a tripod, whose light-sensitive element (material) has been exposed to the same scene from the time that a first image is collected to the time that a last image is collected. The method overcomes limitations of hand-held video and image recording devices, allowing the user to easily create stable long exposure effects normally associated with high-end digital still cameras under expert control.

The term "image", is generally used herein to mean an electronic representation of a captured still photograph (picture) or a frame of a video sequence. For the purposes of the discussion herein, the terms "image", "photograph" and "picture" are substantially synonymous.

It will be appreciated that the method/apparatus of the present invention is referred to as generating "simulated" long exposures (long exposure-time images), because the shutter is not actually retained in an open position for the duration of the long exposure time. Instead, multiple images of short to normal exposure, preferably $1/60^{th}$ of a second or less, are processed and "combined" in a specialized way to create the long exposure output. It will be noted that the term "short exposure" used herein is directed to providing contrast from the term "long exposure", although a so called "short exposure" can be captured with what may be referred to as normal exposure settings.

The short exposure time is sufficiently short for the given conditions under which the camera device is being used in taking the sequence of input images. For example, typical handheld camera exposures of up to about $1/60^{th}$ of a second can be obtained with minimal shake. Cameras containing anti-shake hardware can in some cases utilize slightly longer exposure times. Aside from ambient lighting issues, selecting exposure time (duration) and aperture for the short exposure image input sequence depends on a number of issues, including: desired quality of result, image resolution, the presence of hardware image stabilization, how the camera is held (its stability), proficiency of the photographer, environment (e.g., wind, rain, etc.). However, it is generally preferable to utilize the shortest exposures which will provide sufficient lighting for the given subject and condition.

Although the term "combined" is used to refer to the process of utilizing the multiple short exposures toward generating a long exposure image, it should be appreciated that the process is more complicated than simply overlaying a series of images, as is brought out in the detailed discussion of the invention. There are a number of process steps necessary toward properly simulating a long exposure, including temporal integration which may be thought of as a means for "filling in" the spaces between successive images toward rendering a natural appearing long exposure image.

The invention is amenable to being embodied in a number of ways, including but not limited to the following descriptions.

An embodiment of the invention is an apparatus for generating long exposure time images (simulated) in response to processing a segment of video frames or a sequence of short exposure time images.

An embodiment of the invention is a method of creating a long exposure time still photograph from a video, comprising: (a) selecting a video; (b) selecting within the video a set of sequential frames which define the interval over which the simulated long exposure still photograph is to be generated; and (c) combining the set of sequential frames through temporal integration to create the long exposure time still photograph.

An embodiment of the invention is a method for generating a long exposure time still photograph in response to processing a plurality of short exposure still photographs, comprising: (a) selecting a set of sequential still photographs; and (b) combining the set of sequential still photographs through temporal integration to create a long exposure time still photograph.

An embodiment of the invention is an apparatus for simulating a long exposure time image capture, comprising: (a) means for capturing a sequence of digital images; (b) a computer with memory coupled to the computer; and (c) programming adapted for execution on the computer for, (c)(i) receiving a sequence of images, from the means for capturing, at a normal exposure time setting in which the duration of the normal exposure time setting is less than the duration of a desired long exposure time image, (c)(ii) selecting a set of sequential images, from within the sequence of images, which span the duration of the desired long exposure time image, and (c)(iii) combining the set of sequential images through temporal integration to create at least one long exposure image.

An embodiment of the invention is an apparatus for simulating long exposure times, comprising: (a) an electronic imaging element adapted for capturing a sequence of digital images; (b) a computer with associated memory coupled to the computer, in which the computer is configured for controlling the electronic imaging element; and (c) programming adapted for storage in the memory and execution on the computer for, (c)(i) capturing a sequence of images, (c)(ii) selecting a set of sequential images which span the length of the desired time exposure within the sequence of images, and (c)(iii) combining the set of sequential images through temporal integration to create at least one long exposure image. It will be noted that the apparatus allows the user to generate any desired number of outcomes from a set of input images, such as in regard to selecting a different subset of the images to process, and changing characteristics of the processing.

It should be appreciated that the resultant long exposure image to be output can span any desired exposure time to be simulated by the apparatus. One of the principle benefits of the invention is that high quality long exposure images can be created without the need of a tripod or other camera mount or remote shutter release, and can be taken under various conditions not amenable to the use of a tripod. In addition, the user can more readily achieve desired long exposure results as the apparatus can provide them with control over the duration of the exposure and even allow the user to try different spans of exposure and other processing characteristics toward achieving a desired result, without the need of reshooting the sequence of images. The sequence of short exposure images collected by the apparatus may comprise frames of a video sequence, or a sequence of still images.

In one embodiment of the invention, camera motion is compensated for among the sequence of captured images prior to performing the temporal integration within the combining process. For example, the motion compensation may comprise performing global motion estimation (GME) and global motion compensation (GMC). It will be recognized by one of ordinary skill in the art that various forms of GME and GMC are well known, wherein these techniques will not be described herein. To provide proper integration, it is also preferable to convert the pixel values in the set of sequential images into linear light values prior to temporal integration when combining. After integration, the apparatus preferably corrects for desired contrast and color balance.

An embodiment of the invention is an apparatus for automatically creating still images having a simulated exposure time which spans a desired time period (e.g., user selected), comprising: (a) an electronic imaging element within a camera adapted for capturing a sequence of digital images; (b) a computer and memory coupled to the computer, the computer configured for controlling the electronic imaging element of the apparatus (e.g., camera); and (c) programming adapted for execution on the computer for, (c)(i) capturing a sequence of images within memory, said sequence spanning a desired time period, (c)(ii) selecting a set of sequential images which span the length of the desired time exposure within the sequence of images, (c)(iii) compensating for camera motion among the sequence of captured images, (c)(iv) converting pixel values in the set of sequential images into linear light values, and (c)(v) combining the set of sequential images through temporal integration to create one or more (simulated) long exposure images.

An embodiment of the invention is a method of creating a long exposure time still photograph from a sequence of captured short exposure images, comprising: (a) capturing a sequence of images (with an image capturing device) which spans a desired time frame for the long exposure time still photograph; (b) compensating for motion of the digital image capturing device (e.g., correcting resultant 'frames' of the image sequence) among the sequence of captured images; and (c) combining the set of sequential images through temporal integration to create the simulated long exposure time still photograph.

The present invention provides a number of beneficial aspects which can be implemented either separately, or in any desired combination, without departing from the present teachings.

An aspect of the invention is a method and apparatus for creating simulated long exposure images in response to performing a specialized combining process on a sequence of images which span at least the desired long exposure interval.

Another aspect of the invention is that it allows long exposure images to be automatically created by a camera device, subject to the collection of sufficient images (image frames) spanning a desired length of simulated exposure.

Another aspect of the invention is to allow average point-and-shoot photographers to create desired long exposure effects.

Another aspect of the invention is to allow photographers to create long exposure image results without the need of stable platforms and equipment, such as tripods and remote shutter actuators.

Another aspect of the invention is the ability to create long exposure images without the need of highly precise camera equipment and control mechanisms.

Another aspect of the invention is that it allows the photographer to create a long exposure image whose start and end times can be selected arbitrarily within a sequence of collected images.

Another aspect of the invention is that it allows the photographer to control aspects of the generated long exposure image even after the source images are collected for making the long exposure image.

Another aspect of the invention is a method that can be integrated within video playback devices which provide fast forward and/or fast rewind operations to remove the jerkiness of playback.

Another aspect of the invention is a method that can be integrated within digital still and/or video camera devices.

Another aspect of the invention is the ability to readily generate new forms of long exposure imaging.

A still further aspect of the invention is that it can be applied to numerous forms of image collecting and processing devices.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 2 through FIG. 9B. It will be appreciated that the apparatus may vary as to configuration and as to details of the parts, and that the method may vary as to the specific steps and sequence, without departing from the basic concepts as disclosed herein.

1. Application of Simulated Long Exposure Images

The present invention can provide for the generation of simulated long exposure images from both still and video cameras. Image capture and processing according to the present invention can be integrated into these cameras to provide automatic long exposure simulation. It should be appreciated that, traditionally, video capture is incompatible with the generation of long exposure still pictures; because of the necessity of supporting a framing rate, such as 60 frames per second (fps), which limits exposure times for such cameras to at most 1/60 second. As technology progresses, it is expected that consumer display devices will adopt higher update rates, such as 120 or 240 pictures per second, which will eventually spur the introduction of increased capture rates for consumer video cameras, which in turn implies shorter exposures for the video pictures. It should also be appreciated that the methods herein are applicable for use in image processing equipment and programs which can be configured according to the invention for generating at least one long exposure image in response to receiving a sequence of shorter exposure images.

2. Problem Formulation

Suppose the desired exposure occurs over the time interval $[0, t_e]$. For a stationary still camera the output values can be modeled as $$s[x, y] = f_s\left( \int_{t=0}^{t_e} u[x, y, t] dt \right) \quad (1)$$

where $u[x,y,t]$ is the light intensity at sensor position $(x,y)$ at time $t$, and $f_s()$ is the function that shapes the results of the temporal integration of light. For clarity of explanation, a number of characteristics of the image sensor are not being modeled, including the following:

1. Effects of spatial integration of light over the area of the $(x,y)$ pixel.
2. Spectral response of the sensor as a function of wavelength.
3. Limitations of single sensor color cameras that require de-mosaicking to achieve three colors (red, green, and blue) for each pixel.

It is desired to generate a long exposure image $s[x,y]$ from a stationary still camera. However, the present invention puts forth the collection of a sequence of images as input, modeled as follows.

$$v[x, y, i] = f_v\left( \int_{t=t_{i,0}}^{t_{i,1}} u[m_{x,i}(x, y), m_{y,i}(x, y), t] dt \right) \quad (2)$$

The functions $m_{x,i}()$ and $m_{y,i}()$ account for any motion of the camera for picture $i$, while the function $f_v()$ is the function that shapes the results of the temporal integration of light, and $[t_{i,0}, t_{i,1}]$ is the exposure interval for picture $i$, $i=0, \ldots, N-1$.

Figure 1:
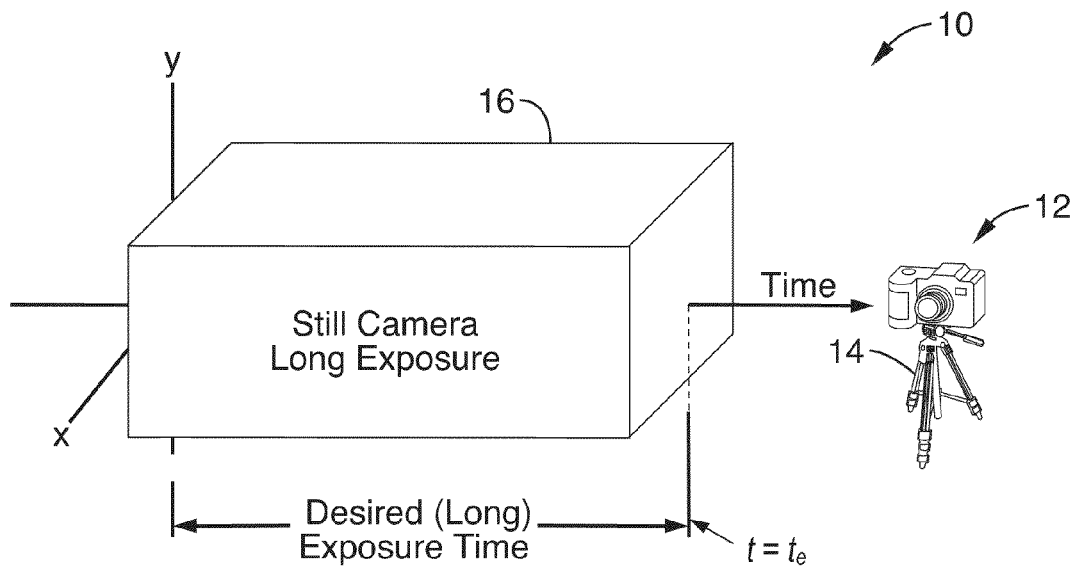
FIG. 1 is a block diagram of a long exposure photograph being taken utilizing a conventional camera.
Figure 2:
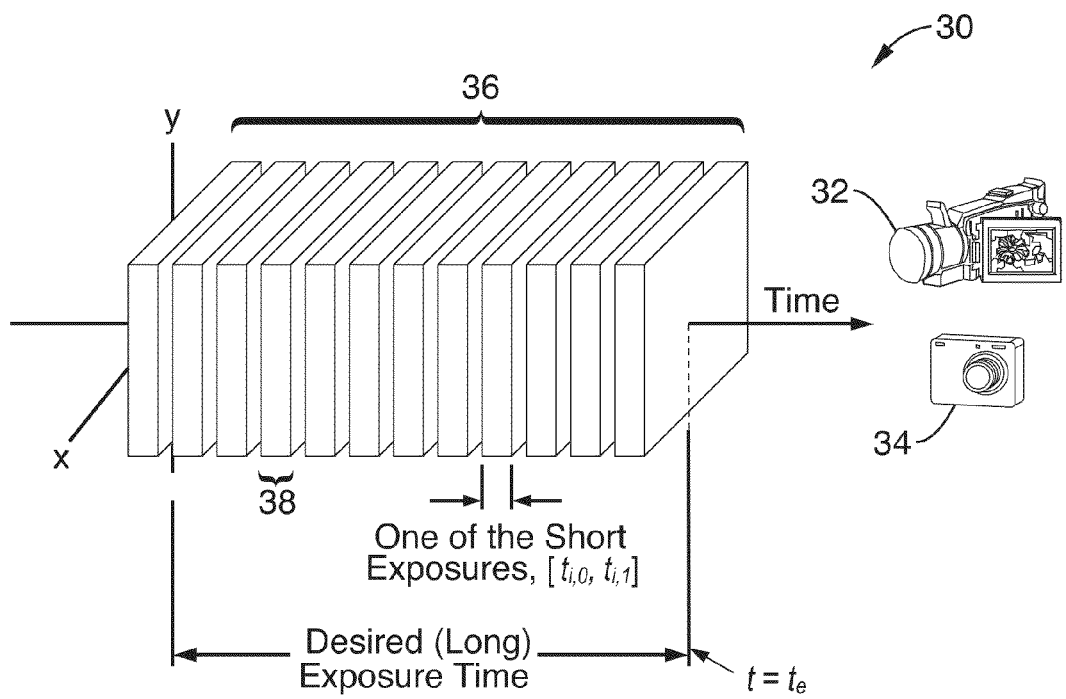
FIG. 2 is a block diagram of a simulated long exposure photograph (image) being generated by a still or video camera from a sequence of images according to an embodiment of the present invention.

FIG. 2 depicts an example of this process which is shown alongside of conventional long exposure image capture of FIG. 1 for comparison purposes. In FIG. 1 is shown the creation 10 of a conventional long exposure image. A still camera 12 is shown in tripod 14 configured for a traditional capture of a long exposure image in response to maintaining an "open shutter" and collecting image lighting over a long interval 16.

FIG. 2 illustrates an embodiment 30 for generating a simulated long exposure image in a significantly different manner than shown in FIG. 1. In contrast to a conventional long exposure method, the present invention utilizes a camera (video 32, or still 34, or combination) for collecting a series of short exposure images 38 of a scene during a desired long exposure interval 36. It will be appreciated that each of these video exposures only captures image information over a subset of the total desired integration time. It should be recognized that cameras 32, 34, are utilized without the need of a tripod. Since the camera may be hand-held, there is also expected to be some camera movement causing misalignment of frames $v[x,y,i]$ relative to each other and also relative to the desired long exposure $s[x,y]$.

Accordingly, an object of the method can be asserted as follows:

Given: Individual still pictures $v[x,y,i]$ $i$, $i=0, \ldots, N-1$ with exposure times $[t_{i,0}, t_{i,1}]$.

Estimate: Long exposure $s[x,y]$ such as would be produced by a stationary still camera over exposure time $[0, t_e]$.

3. Problem Solution

Figure 3:
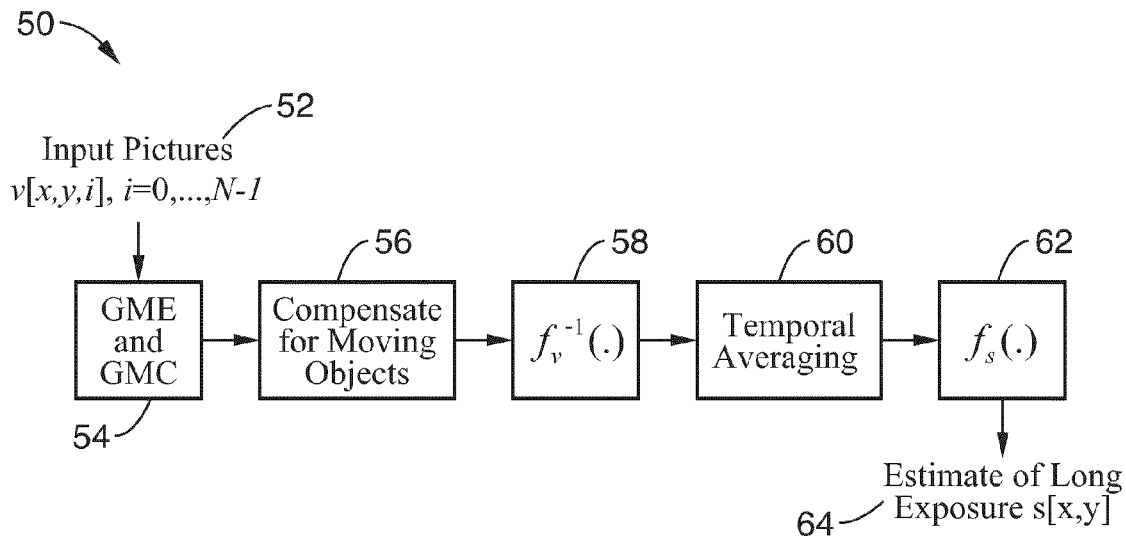
FIG. 3 is a flowchart of a simulated long exposure generation method according to an aspect of the present invention, showing multiple short or normal exposure images being input from which a long exposure image is created.

FIG. 3 illustrates an example embodiment 50 of a solution to the problem formulated in the previous section and is shown with several general components 52-64, which are also listed below as steps 1-7.

1. Plurality of input pictures are captured. (52).
2. Global motion estimation (GME) and compensation (GMC) to compensate for camera movement among the input pictures. (54).
3. Compensation for independently moving objects. (56).
4. Application of the inverse of function $f_v()$. (58).
5. Temporal averaging. (60).
6. Application of the function $f_s()$. (62).
7. Outputting estimated long exposure image $s[x,y]$. (64).

It is important to note that these steps need not be completed in the stated order, and sub-optimal approximate solutions could even completely bypass one or more of these steps to reduce computational complexity. Each of the components is discussed in additional detail below.

3.1 Global Motion Estimation and Compensation.

In situations in which camera motion arises between the captured image frames of the sequence, it should be preferably eliminated by post processing prior to combining the images, so as to produce a proper long exposure simulation. Compensating for camera motion is a well studied problem. A few general techniques will be mentioned here, without the need of discussing the technical details of their implementation which are recognized in the art. The methods can be separated into two broad categories, local and global. Local techniques use local motion analysis, for example block matching, phase correlation, optical flow, or feature tracking, followed by robustly fitting the resulting local motions to a global model. Global techniques analyze entire pictures, for example globally applying phase correlation or globally constrained application of the optical flow equations, and are designed to provide a robust solution either explicitly or implicitly.

Whichever method of global motion estimation and compensation are chosen, the result is a video picture that has been warped according to the global model so that it is properly aligned with its reference picture. When a plurality of such pictures are viewed in sequence, any apparent motion due to camera movement is removed, resulting in a stable background as though the sequence were acquired with the assistance of a tripod or associated accessories like a cable shutter release or remote control.

3.2 Application of the Inverse of Function $f_v(\ )$.

At this stage it is considered that all input pictures are sufficiently aligned with one another. However, the data points are not represented by linear light values as necessary in the "temporal averaging" step. It should be appreciated that there exist a number of methods in the literature for estimating camera response function $f_v(\ )$ from observed data. It will be appreciated by one of ordinary skill in the art that any desired method which effectively maps the light response of the imaging device can be utilized. In applying the method for a particular camera, it can be assumed that $f_v(\ )$ is known to the manufacturer. Alternatively, generic approximations for $f_v(\ )$ may be made use of which encompass characteristics common to many different cameras. Approximate models can be fine tuned as desired according to the present invention, such as in response to results generated.

Regardless of the technique employed for compensating for $f_v(\ )$, the resulting pixel values are now in linear light units, which render the "temporal averaging" step theoretically meaningful, and in practice provides a more accurate simulation of long exposure imaging.

3.3 Compensate for Independently Moving Objects.

As shown in FIG. 2 the sequence of images naturally includes temporal gaps, between images (frames) 38, relative to the desired temporal interval [0,$t_e$]. It should be appreciated FIG. 2 represents these gaps by way of example and not by way of limitation; whereas the time period represented by these gaps may in actuality be less than, equal to, or greater than the duration of a given exposure. In cases where object motion in the scene is relatively slow, these gaps would have little noticeable affect when simulating a long exposure still; it would be possible to perform the temporal averaging without compensating for the object motion. However, in many cases the object motion needs to be fully considered.

Figure 4:
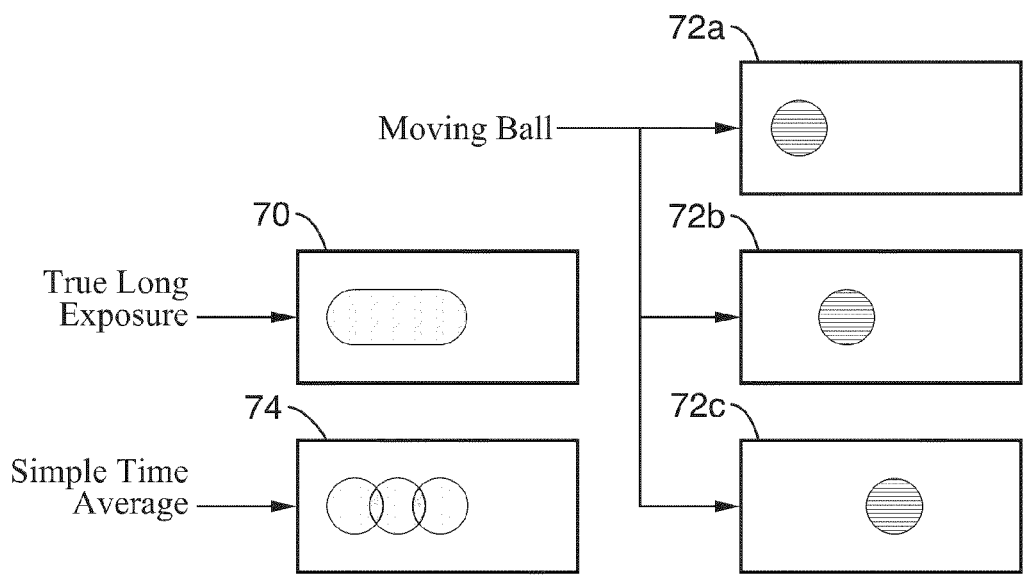
FIG. 4 is a group of blocks depicting long exposure elements in relation to simulated long exposure image processing according to an aspect of the present invention.

FIG. 4 illustrates the problem with compensating for moving objects. In block 70 is shown the motion spread of a true long exposure image as a dark ball moves through the white field of view during exposure. Blocks 72a-72c depict sequential frames in which the ball is translating to the right on the white background. It will be appreciated, that if the long exposure is simulated by simply averaging these three video pictures (72a-72c), then the result will appear as shown in block 74. In this simple averaging view, the three balls are distinctly visible while overlapping portions of the balls appear darker than the non-overlapping portions. Such a result clearly does not simulate the image shown in block 70 with a true long exposure. Thus, simple combinations of the images do not provide the desired result. In a true long exposure still picture, the motion of the ball should appear as shown in block 70 having a smooth motion blur.

To avoid the problem depicted in FIG. 4, the motion of the objects must be fully considered. Regions that are moving independently of the background need to be identified, and artificial motion blurring performed. By properly pre-processing pictures according to the moving objects, temporal averaging as described in the next sub-section can be successfully applied without introducing the kind of artifacts shown in FIG. 4.

3.4 Perform Temporal Averaging.

Temporal averaging, or integration, refers to the process of integrating data, in this case pixel data, across an interval of time. Accordingly, a long exposure still image can now be estimated at each pixel by performing a discrete summation of the N input pictures v[x,y,i] after compensation for camera motion, compensation for $f_v(\ )$, and compensation for independently moving objects. The result of the discrete summation is an approximation to the continuous integral $$\int_{t=0}^{t_e} u[x, y, t]dt.$$

3.5 Application of $f_s(\ )$.

Application of $f_s(\ )$ provides for imposing the desired contrast and color balance to the final image values. The present invention does not specify the particular function to use, because the characteristics of the function depend on desired image characteristics. It will be appreciated that different camera manufacturers utilize different methods for shaping their response functions on camera output contrast and color balance.

4. Input Variations for Simulated Long Exposure

Numerous variations can be provided in the generation of long exposure stills; three such extensions are here described as (1) super-resolution, (2) temporal subsampling of video sequences, and (3) combining high resolution still pictures with lower resolution video.

4.1 Super-Resolution Techniques.

In the video processing arts, the term "super-resolution" (SR) usually refers to the procedure by which the resolution of an image (picture) is increased by combining it with additional pictures, where the additional pictures are typically captured in very close temporal and/or spatial proximity. These images are used in combination to generate a frame having higher resolution than any of the original images. A recent trend in SR techniques is to achieve higher color resolution by using the multiple pictures to improve color demosaicking (often also spelled "demosaicing"). Numerous examples of SR and SR demosaicking are present in the technical literature, wherein these need not be discussed herein.

It should be appreciated that inclusion of these SR techniques is particularly well suited for use with the generation of simulated long exposure images according to the present invention. Using these SR techniques the resolution of the simulated long exposure image need not be limited to the resolution which is available for capturing each of the sequence of input images. For example, frames of video which are typically captured at a resolution below that of good quality still images, can be combined according to the invention to create a simulated long exposure still image having a higher resolution than the captured video frames.

4.2 Temporal Subsampling of Long Video Sequences.

It will be appreciated that the number of input images to be processed depends on the length of the desired long exposure time to be simulated according to the apparatus and method. Toward reducing processing overhead, at least one mode of the present invention is configured for performing one or more subsampling processes to reduce overhead and simplify processing.

By way of example, and not limitation, one simple mechanism to summarize a long sequence is to subsample it in time.

An example of "subsampling" which will be known to consumers is that of "fast forward" of a video which reduces frame output to speed playback. According to aspects of the invention, a sequence can be compressed by a factor of K by keeping just one out of every K input pictures and discarding the rest, which when viewed in time is equivalent to fast forwarding by a factor of K. It should also be appreciated that instead of using the simple subsampling described, the apparatus of the present invention can extract information from multiple frames to create a representative frame at the subsampled rate, such as preferably using the simulated long exposure. The subsampled frames can then be used as a slower frame rate video, or used as input to create a long exposure frame or set of frames at another sampling level. One of ordinary skill in the art will appreciate that numerous implementations may be put forth without departing from the teachings herein.

Aside from use with cameras and image capture and processing devices, the simulation of long exposure images according to the present invention can also be directed to applications which rely on subsampling, such as the fast forwarding example described. It will be noted that an unfortunate side effect of simple subsampling, such as used for fast-forwarding, is that the resulting video can appear unnatural, displaying moving objects with a broken, jerky appearance, while small camera motions from hand-held cameras can become distractingly shaky. The simulated long exposure method taught herein can be utilized in these instances to overcome the jerky appearance of the subsampled video sequence, because the moving objects are inherently blurred due to the simulated long exposure times. Taking periodic long exposures from the video simulates a video sequence that would have been observed if each video frame were acquired with longer exposures. To prevent shakiness from hand-held camera motion, camera stabilization technology may be also preferably utilized.

Figure 5:
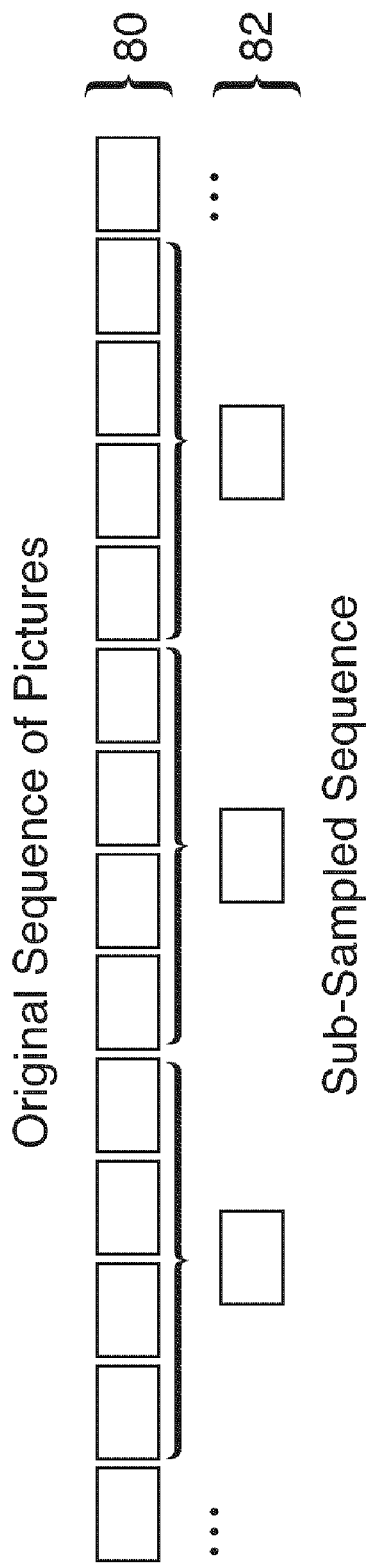
FIG. 5 is a block diagram of an original sequence of images and a subsampled sequence according to an aspect of the present invention.

FIG. 5 illustrates an example of a subsampled sequence 82 generated by using simulated long exposures according to the present invention. An original sequence of video pictures 80, is processed in groups to create longer exposure subsampled images 82, toward providing a shorter compressed-time representation of the original video.

A number of variations of the above subsampling can be performed without departing from the inventive teachings. For example, the preceding discussion assumed a fixed temporal subsampling factor. A more advanced version can be configured for analyzing the sequence in time and subsampling more sparsely in relatively inactive time segments, and subsampling more densely in relatively active time segments. Long exposure subsampling would thus make use of different exposure times depending on the activity in the scene.

4.3 Combining High Resolution Stills and Lower Resolution Video.

A number of digital video camcorders allow independent capture of high-resolution still pictures while recording video. Combining such a capability with long exposure stills from video allows the creation of long exposures that contain the best of both methods. The following examples are provided by way of example and not limitation. (1) The high-resolution of the still pictures from an image capturing device can provide sharp details of the static parts of the scene. (2) The moving parts of the scene can come from the long exposure stills as described in this document. Since moving regions for long exposures are by design motion blurred, the slight loss in resolution compared to the high resolution still picture would not negatively affect the final result. The above as well as variations and combination thereof provide a combination of functionality for creating high resolution long exposures from video.

According to one mode of the invention, the camera can be configured to automatically capture video frames surrounding the capture of a still image, for example commencing video capture as the shutter button is partially pressed to enter focus mode, and continuing to capture frames until some time after the shutter button is fully released. Alternatively, or additionally, the control of when to capture video frames can be selective in response to camera position, motion, user grip, and other sensed camera conditions indicative of a shot being prepared or held by the photographer.

5. Hardware Considerations

Figure 6:
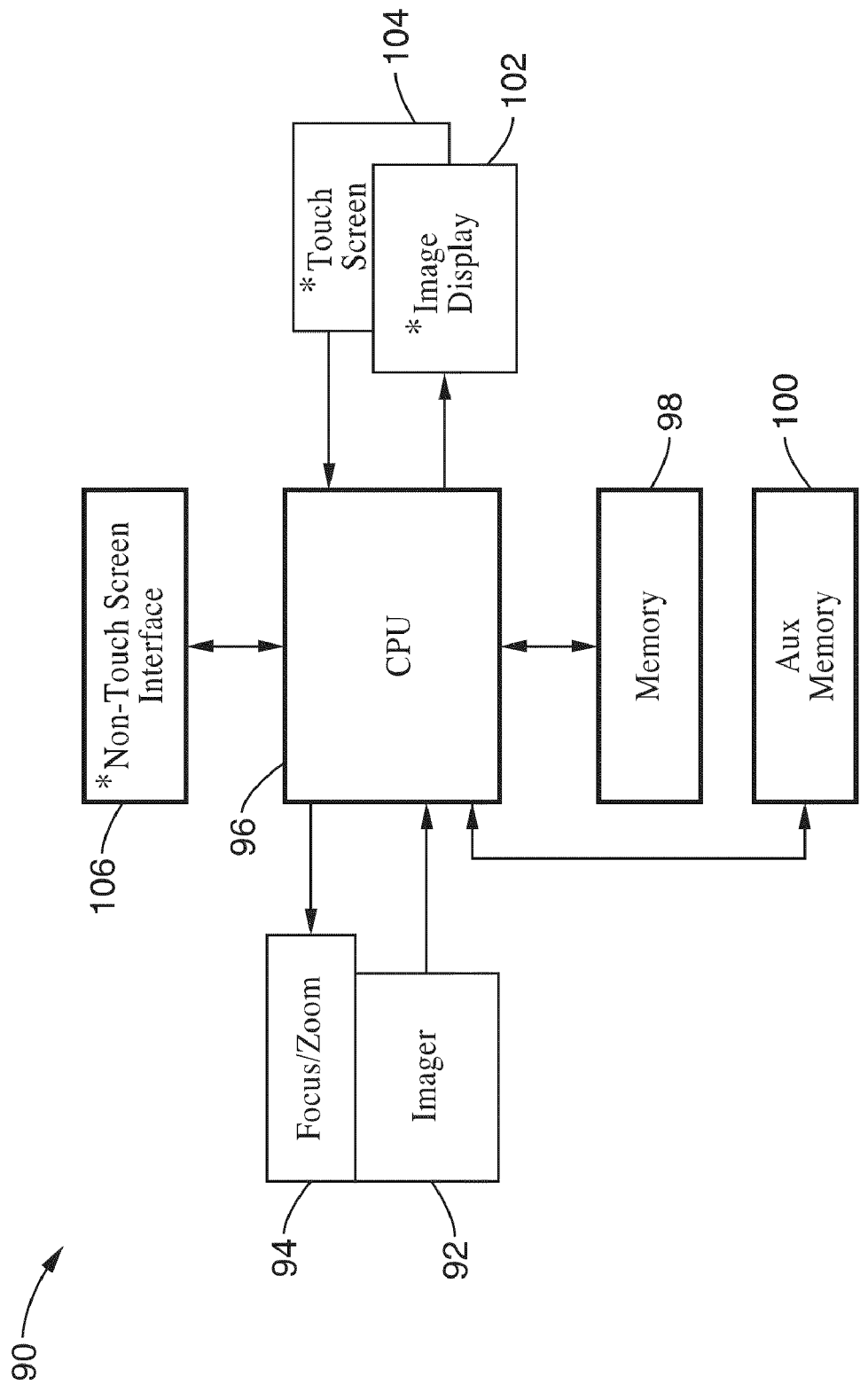
FIG. 6 is a block diagram of a camera device configured for generating simulated long exposure images according to an aspect of the present invention.
Figure 7A:
FIG. 7A-7B are images depicting the artistic use of long exposure imaging (FIG. 7B) to highlight a stationary subject (woman in the plaid skirt) seen in a normal exposure image (FIG. 7A) amidst an otherwise active scene.
Figure 7B:

FIG. 6 illustrates an example embodiment 90 of an apparatus configured for generating simulated long exposure images according to the invention. In the figure an image capture device (camera) 90 is shown configured for performing simulated long exposures according to the invention. A focus/zoom control 94 is shown coupled to imaging optics 92 as controlled by a computer (CPU) 96. Computer 96 controls the camera and performs the simulated long exposure generation method in response to instructions executed from memory 98 and/or auxiliary memory 100. Captured images may be stored in memory 98, auxiliary memory 100, or other forms of associated memory, such as media cards, discs, and so forth. Shown by way of example for a camera device (e.g., video or still) are an optional image display 102, optional touch screen 104, and optional non-touch screen 106.

The above figure is shown by way of example and not limitation. It should be appreciated that the method according to the present invention can be implemented on various image capture and processing devices which are configured for capturing/receiving a sequence of images and outputting a simulated long exposure image. The method can be implemented either on the imaging device itself, or separate from the imaging device as an automatic post-processing feature. The present invention can be implemented in hardware or software, depending on the target system. If implemented off the imaging device, on a personal computer for example, a sequence of images v[x,y,i] is input from an imaging device to the personal computer. For example, a software program containing programming for performing the method of the present invention can be executed on a personal computer to generate the long exposure still pictures. External devices on which the method could be employed are not limited to personal computers. For instance a photo printer configured with programming according to the invention could import the input pictures, create a long exposure still picture, and print results.

When implemented on an imaging device according to the present invention, the imaging device can be configured in at least three ways, including: (1) it could operate in a "long exposure" mode, which would allow the user to record a long exposure still; or (2) it can operate in an augmented mode in which additional frames are collected to allow the user to select from normal image capture output or limited long exposure output, or (3) it could operate in a post-processing mode, which would allow the user to select existing input pictures (stills or video) for which a long exposure still is to be generated in response to simulation.

If the method of the present invention is implemented in a post-processing mode, either on the imaging device or outside of it, a flexible feature would be an incremental long exposure still. Starting with a single frame of video, for example, the user could incrementally add additional frames and see how the resulting long exposure still picture is changing with each frame; until the desired appearance has been reached, and the user could stop the exposure. In one mode of the apparatus, the changing of exposure duration is displayed for the user incrementally, sort of like seeing an image develop in a darkroom, but in this case seeing the long exposure characteristics appearing as the process is shown with progressively different time periods. Such a feature would give the user precise control over the appearance of the long exposure, and take the guesswork out of choosing the exposure time.

6. Examples of Simulated Long Exposures from Video

FIG. 7A through 9B provide a few examples of long exposure still pictures generated from a sequence of captured images (e.g., video) according to the invention. The original image sequence was acquired using a hand-held video camera without the use of any physical stabilizing mechanism, such as a tripod.

The first example illustrates an example of "artistic motion blur". Numerous pedestrians are equally visible in FIG. 7A, making it unclear what the photographer is trying to show. By simulating a ⅓ second exposure from a sequence of image frames, the moving people in FIG. 7B become blurred and it becomes obvious that the woman, wearing the plaid skirt, and seen in the background is the true subject of interest.

It should be appreciated that to obtain this long exposure with conventional methods, the photographer would be required to: (1) recognize the opportunity, (2) set up a tripod, (3) select the desired long exposure interval, and (4) take the shot. This would be rather inconvenient in a busy location. And what if the subject were to move while the shutter is still open?

Although this example is of a rather limited "long exposure" interval, the problem would be more pronounced with exposures of longer duration. When capturing conventional long exposure images, the photographer commences image collection for a set duration, not knowing if the shot will be interrupted and thus ruined. According to the present invention, the user can simply control the start and end points within the sequence of images, so that an interruption does not ruin the shot or prevent introducing at least some long exposure expression into the shot.

In fact, at least one mode of the present invention can be configured, such as for very long exposures, to allow the user to select not only the end points, but even the exclusion of frames (e.g., containing artifacts) to be eliminated from within the sequence. This can be useful, for example, in a long exposure scenery shot when a bird flits by the camera lens, or a jet flies through the shot. In this way the long exposure can be generated without the inclusion of spurious events during the time exposure, generating a result that appears as if these events never occurred. In one mode of the invention, the apparatus itself can identify candidate frames (or frame sequence portions) which the user may desire to exclude. Deciding which frames are candidates for exclusion can be performed by the apparatus, by way of example and not limitation, in response to detecting a sufficient motion in a portion of the frame in which other motion is not arising during the remainder of the sequence of images. It should be appreciated that other mechanisms can be utilized for identifying candidate frames for exclusion from the processing of the long exposure.

In one mode of the present invention the apparatus is configured to allow the user to select the start and end points within the sequence of images that are used as input for generating the simulated long exposure output. Although this feature need not be supported in all apparatus or application, it provides additional user control of generating long exposures. It should be appreciated that this can be implemented by utilizing a default, such as generating the long exposure based on all available frames, and then allowing the user to change the length of the sequence, either in total or with respect to either the start of end of the sequence.

Figure 8A:
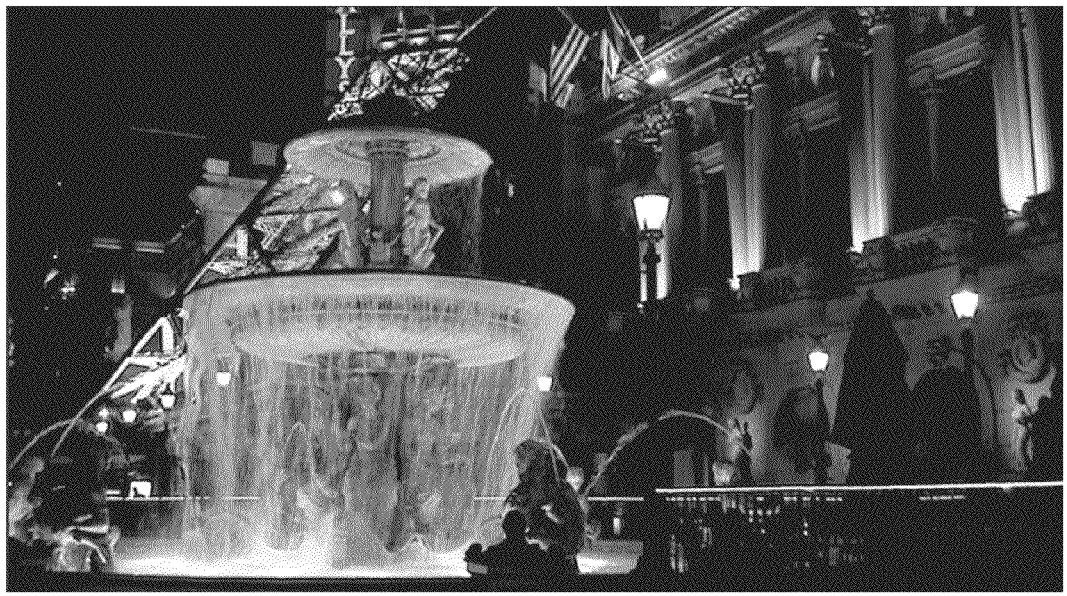
FIG. 8A-8B are images depicting the artistic use of long exposure imaging to smooth the flow of water shown in FIG. 8A in moving to the long exposure image of FIG. 8B.
Figure 8B:

The second example of FIG. 8A-8B illustrates the effect created in a long exposure by moving water, in this case water flowing from a fountain. A single still image is shown in FIG. 8A with a normal exposure (e.g., $\frac{1}{60}^{th}$ second). In FIG. 8B a simulated exposure of ⅔ of a second is generated according to the invention from a sequence of images like those shown in FIG. 8A. It should be noted how the long exposure provides a smooth misty effect that softens the appearance in comparison to that shown in FIG. 8A.

Figure 9A:
FIG. 9A-9B are images depicting the artistic use of long exposure imaging to trace motions through the scene as vehicles which appear stationary in FIG. 9A become a blur of action in moving to the long exposure image of FIG. 9B.
Figure 9B:

The final example of FIG. 9A-9B illustrates the effect created in a long exposure from moving vehicles. A simple still picture is shown in FIG. 9A utilizing a normal exposure. A sequence of normal exposures (of less duration that the desired long exposure) images is combined according to the invention to produce a simulated long exposure image as represented by FIG. 9B spanning ⅔ of a second. It will be noted that use of the long exposure emphasizes the motion of the vehicles, making it more obvious to a viewer the dynamic characteristics of the scene captured by the long exposure still.

In general, both the normal still pictures and long exposure still pictures have their individual merits. However, depending on the photographer, the long exposure still may be the better choice for expressing his or her creative intentions in many situations.

7. Variations and Additional Uses for the Method

A number of variations have been discussed above for providing additional user control over the generation of simulated long exposure images. The following describes additional uses and variations beyond those already discussed. The generation of simulated long exposure stills provides numerous significant benefits, while the techniques taught herein can be extended in both its applicability and functionality.

The teachings of the present invention which have been discussed thus far are primarily directed toward providing a simple to use means of generating simulated long exposure images which are substantially equivalent to those which would be created using a still camera on a fixed platform (e.g., tripod) with a remote shutter release. However, it should be appreciated that aspects of the process for generating these long exposure images can be altered for creating variations of the long exposure image and/or other forms of special camera effects which may be desirable in select applications. Following are a few examples provided by way of example and not limitation. It should be recognized that each of the following can be used separately or in various combinations.

7.1 Changing Imaging Settings.

In a simple implementation, the camera settings for capturing the sequence of images, can be selected automatically by the camera so as to simplify simulating the long exposures. In other implementations, the image sequence or video, being used as the input for generating the long exposure images, can be input in a number of different ways or in response to a number of different settings of the image capture device. One interface according to the invention allows the user to select settings, or over ride the automatic settings, in capturing these images. For example, according to one aspect of the invention the apparatus is configured to allow the user to set aperture and exposure (or have limited control of these), and other settings, for the images being utilized for generating the simulated long exposure images. At least one mode of the present invention provides for performing any necessary adjustments to use the input sequence despite it being collected at different camera settings.

7.2 Dynamic Imaging Settings.

The above static selection of image controls are described for use when collecting the entire sequence of images. However, more complex aspects of the present invention can be implemented which allow the user to select dynamically varying imaging characteristics while collecting the sequence of images used for creating the long exposure images. Example 1: changing the exposure time, or aperture setting to vary the total lux during image collection to increase or decrease the influence of particular portions of the scene (e.g., beginning, end, middle, and so forth). Example 2: varying exposure time in combination with aperture toward changing depth of field during the collection of images for use in the long exposure. Modes of the present invention can thus be adopted to allow user selection of these dynamic variables in controlling aspects of the image sequence being collected.

7.3 Selective Long Exposure Simulation.

In traditional long exposure image capture, the long exposure necessarily applies to the entire image. However, in view of the selective processing provided by the present invention, portions of the image field, or specific objects therein, can be selected, or eliminated from consideration, when applying the long exposure simulation. In this way, elements or portions of the scene, can be output subject to different levels of long exposure simulation. One mode of this selecting process would allow the selection of objects based on the relative presence/absence of motion. An example of this is applying the long exposure to the moving elements of the scene, or the rapidly moving elements, or the most rapidly moving elements, without performing the long exposure processing on the static, or semi-static, portions of the scene. Equally, the converse can be performed selecting the more static elements as desired. The long exposure is thus selectively applied with respect to areas or objects. By way of example one area of the image, or a selected object in the image view may be selected for long exposure with the rest of the image left unmodified.

7.4 Automatic Output Variations.

In discussing the generation of simulated long exposure outputs, the number of long exposure stills generated for a single input sequence has not been discussed. Modes of the present invention allow the method and apparatus to generate variations of the long exposure output. These variations can be generated in response to user input, or alternatively automatically or semi-automatically. One such variation would include changing the time span over which the long exposure is taken. Another variations involves changing the manner in which the long exposure is simulated.

By way of example and not limitation, the apparatus can generate some variations and allow the user to select which of these they desire to save. The apparatus can be configured to allow a user to specify a maximum duration, (e.g., 60 seconds) of the long exposure. After generation of a resultant long exposure image, the apparatus can allow the user to change aspects of the processing, wherein the specific results can be selected. For example, the duration of the long exposure can be reduced, such as down from 60 seconds to 20 seconds or 30 seconds, to provide the results being sought by the user. These multiple results may be discarded or saved as desired. One embodiment of the apparatus can allow aspects of the temporal integration and other processing to be changed to provide different output. It will be noted that such variation is not possible when conventionally capturing long exposure images.

7.5 Non-Traditional Long Exposure Output.

The teachings above generally discuss generating long exposure images which closely simulate that which would be captured conventionally with a long exposure if one had a sufficiently stable platform. However, modes of the present invention can provide for generating non-traditional long exposure images. One example of this is to provide selection of the extent of integration, such as not integrating, partially integrating, or fully integrating the images. Without integration, a moving object in the frame is seen multiple times in multiple locations in the result, possibly overlapping. If limited integration is used then there remains some remnant of the periodic nature of the input images. These techniques can be readily provided in response to subsets of the present invention. Thus, the method of the invention can automatically generate types of long exposure images which are not possible using conventional long exposure techniques.

7.6 Rack Focus Long Exposure Simulation.

A technique which has some similarities to long exposure images is that of rack focus imaging. Traditionally, the use of "rack focus" is a video technique where the focus is "racked" (quickly changed) in moving between two objects within the field of view. The present invention can allow the simulation of rack focus still images which can not be produced using conventional techniques. Implementations of the present invention can be configured to allow a long exposure image to be created in response to changing between a first and second focus settings. In this variation, at least two images are captured in a sequence of images for at least two different focal lengths. For example, the apparatus can capture a sequence of images across a range of focus settings which are combined in the long exposure method. The processing can provide one portion of the image in focus while transitioning to show the changing focus on the remainder. In this way an image can be produced which has a proper far center focus on an object and object trails extending therefrom with out of focus foreground objects. It should be appreciated that many variations of this are possible, including rack zoom simulations, as well as variations and combination thereof.

7.7 Video Long Exposures.

Although it sounds paradoxical, because video is by nature a series of short exposure images, however, the modes of the present invention allow generating simulated long exposures for video. This mode of the invention can provide for automatically generating long exposure streaking and blurring within a video, or video segment. Basically, a target frame of the video is modified according to the long exposure techniques using a number of preceding frames, but instead of outputting a single still image output, the process continues with the next target frame and so forth. The depth of the sequence prior to the target frame determines the extent to which smoothing and long exposure streaking arise. It should be appreciated that this can be utilized separately or in combination with other techniques described herein.

8. Conclusion

The present invention provides methods and apparatus for generating simulated long exposure images in response to the input of a sequence of short exposure images. Inventive teachings can be applied in a variety of apparatus and applications, including cameras (still and/or video), video processing equipment and software, video playback devices, and so forth.

As can be seen, therefore, the present invention includes the following inventive embodiments among others:

1. A apparatus for simulating a long exposure-time image, comprising:
   (a) means for capturing a sequence of digital images;
   (b) a computer with memory coupled to said computer; and
   (c) programming adapted for execution on said computer for,
      (i) receiving a sequence of normal exposure images at a normal exposure time setting from said means for capturing, in which image capture duration of said normal exposure time setting is less than a desired long exposure interval over which a simulated long exposure time image is to be obtained,
      (ii) selecting a set of sequential images, from within said sequence of images, which span the desired long exposure interval, and
      (iii) combining the set of sequential images through temporal integration to create at least one long exposure image.

2. An apparatus as recited in embodiment 1, wherein said long exposure image can span any desired simulated exposure time.

3. An apparatus as recited in embodiment 1, wherein stable long exposure images are created by said apparatus without necessitating use of a tripod, or other camera mount.

4. An apparatus as recited in embodiment 1, wherein said sequence of images comprise frames of a video sequence.

5. An apparatus as recited in embodiment 1, wherein said long exposure image comprises a digital still photograph.

6. An apparatus as recited in embodiment 1, further comprising compensating for apparatus motion among said sequence of captured images prior to combining the set of sequential images.

7. An apparatus as recited in embodiment 1, further comprising:
   compensating for apparatus motion among said sequence of captured images prior to combining the set of sequential images; and
   wherein said compensating comprises performing global motion estimation (GME) and global motion compensation (GMC).

8. An apparatus as recited in embodiment 1, further comprising converting pixel values in said set of sequential images into linear light values prior to temporal integration when combining.

9. An apparatus as recited in embodiment 1, further comprising correcting for desired contrast and color balance after combining said sequence of images.

10. A camera configured for automatically creating still images having a simulated exposure time spanning a desired time period, comprising:
    (a) an electronic imaging element within a camera adapted for capturing a sequence of digital images;
    (b) a computer with memory coupled to said computer, said computer configured for controlling said electronic imaging element of said camera; and
    (c) programming adapted for execution on said computer for,
      (i) capturing, within said memory, a sequence of images spanning a desired time period,
      (ii) selecting a set of sequential images which temporally span a desired long exposure interval within said sequence of images,
      (iii) compensating for camera motion among said sequence of captured images,
      (iv) converting pixel values in said set of sequential images into linear light values, and
      (v) combining the set of sequential images through temporal integration to create one or more simulated long exposure images.

11. An apparatus as recited in embodiment 10, wherein stable long exposure images are created by said camera without necessitating use of a tripod, or other camera mount.

12. An apparatus as recited in embodiment 10, wherein said sequence of images comprise frames of a video sequence.

13. An apparatus as recited in embodiment 10, wherein said long exposure images comprise long exposure digital still photographs.

14. An apparatus as recited in embodiment 10, wherein said compensating for camera motion comprises performing global motion estimation (GME) and global motion compensation (GMC).

15. An apparatus as recited in embodiment 10, further comprising correcting for desired contrast and color balance after combining said sequence of images.

16. A method of creating a long exposure time still photograph from a captured sequence of short exposure images, comprising:
    capturing a set of sequential images with a digital image capturing device, said set of sequential images spanning a desired time frame for a long exposure time still photograph;
    compensating for motion of the digital image capturing device among said set of sequential images; and
    combining said set of sequential images through temporal integration to create at least one long exposure time still photograph having said desired time frame.

17. A method as recited in embodiment 16, further comprising converting pixel values in said set of sequential images into linear light values prior to performing temporal integration.

18. A method as recited in embodiment 16, wherein stable long exposure images are created by said method without necessitating mounting of the image capturing device on a tripod or other fixed mount.

19. A method as recited in embodiment 16, wherein said compensating for motion of the image capturing device comprises performing global motion estimation (GME) and global motion compensation (GMC).

20. A method as recited in embodiment 16, further comprising correcting for desired contrast and color balance after combining said sequence of images.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for simulating a long exposure-time image, comprising:
   means for capturing a sequence of images which are digital images;
   a computer with memory coupled to said computer; and
   programming adapted for execution on said computer for:
   receiving a sequence of normal exposure images at a normal exposure time setting from said means for capturing, in which image capture duration of said normal exposure time setting is less than a desired long exposure interval over which a simulated long exposure time image is to be obtained;
   selecting a set of sequential images, from within said sequence of images, which span the desired long exposure interval;
   performing global motion estimation and compensation wherein camera motion arising between each of said sequential images is eliminated by post processing;
   identifying regions of independent motion from a background in the set of sequential images; and
   performing artificial motion blurring on said regions of independent motion, prior to combining the set of sequential images through temporal integration, to create at least one long exposure image.

2. An apparatus as recited in claim 1, wherein said long exposure image spans a simulated exposure time of at least one-half (½) second.

3. An apparatus as recited in claim 1, wherein stable long exposure images are created by said apparatus without necessitating use of a tripod, or other camera mount.

4. An apparatus as recited in claim 1, wherein said sequence of images comprise frames of a video sequence.

5. An apparatus as recited in claim 1, wherein said long exposure image comprises a digital still photograph.

6. An apparatus as recited in claim 1, further comprising programming adapted for execution on said computer for automatically generating long exposure streaking and blurring to create said artificial motion blurring.

7. An apparatus as recited in claim 6, further comprising:
   programming adapted for execution on said computer for utilizing image sequence depth prior to target frame as a determiner of extent to which said long exposure streaking and blurring are generated.

8. An apparatus as recited in claim 1, further comprising programming adapted for execution on said computer for:
   converting pixel values in said set of sequential images into linear light values prior to temporal integration when combining;
   wherein said pixel values are converted by applying an inverse of a response function for a camera; and
   wherein said camera response function comprises a mapping of light response of an imaging device of said camera.

9. An apparatus as recited in claim 1, further comprising programming adapted for execution on said computer for correcting for desired contrast and color balance after combining said sequence of images.

10. A camera configured for automatically creating still images having a simulated exposure time spanning a desired time period, comprising:
    an electronic imaging element within a camera adapted for capturing a sequence of digital images;
    a computer with memory coupled to said computer, said computer configured for controlling said electronic imaging element of said camera; and
    programming adapted for execution on said computer for:
    capturing, within said memory, a sequence of images spanning a desired time period, which temporally span a desired long exposure interval;
    compensating for camera motion among said sequence of images;
    converting pixel values in said sequence of set of sequential images into linear light values;
    identifying regions of independent motion from a background in the sequence of images; and
    performing artificial motion blurring on said regions of independent motion prior to combining the sequence of images through temporal integration to create one or more simulated long exposure images.

11. An apparatus as recited in claim 10, wherein stable long exposure images are created by said camera without necessitating use of a tripod, or other camera mount.

12. An apparatus as recited in claim 10, wherein said sequential images comprise frames of a video sequence.

13. An apparatus as recited in claim 10, wherein said long exposure images comprise long exposure digital still photographs.

14. An apparatus as recited in claim 10, further comprising programming adapted for execution on said computer for automatically generating long exposure streaking and blurring to create said artificial motion blurring.

15. An apparatus as recited in claim 10, further comprising programming adapted for execution on said computer for correcting for desired contrast and color balance after combining said sequence of images.

16. A method of creating a long exposure time still photograph from a captured sequence of short exposure images, comprising:
    capturing a set of sequential images with a digital image capturing device, said set of sequential images spanning a desired time frame for a long exposure time still photograph;
    compensating for motion of the digital image capturing device among said set of sequential images wherein camera motion arising between each of said sequence of digital images is eliminated by post processing;
    identifying regions of independent motion from a background in the set of sequential images;
    performing artificial motion blurring on said regions of independent motion prior to combining said set of sequential images through temporal integration to create at least one long exposure time still photograph having said desired time frame.

17. A method as recited in claim 16, further comprising:
    converting pixel values in said set of sequential images into linear light values prior to performing temporal integration;
    wherein said pixel values are converted by applying inverse of a response function for a camera; and wherein said camera response function comprises a mapping of light response of an imaging device of said camera.

18. A method as recited in claim 16, wherein stable long exposure images are created by said method without necessitating mounting of the image capturing device on a tripod or other fixed mount.

19. A method as recited in claim 16, further comprising programming adapted for execution on said computer for automatically generating long exposure streaking and blurring to create said artificial motion blurring.

20. A method as recited in claim 16, further comprising programming adapted for execution on said computer for correcting for desired contrast and color balance after combining said sequence of images.

* * * * *